United States Patent [19]

Taylor et al.

[11] 4,002,583

[45] Jan. 11, 1977

[54] SUBSTRATE COATING COMPOSITION

[75] Inventors: Lynn J. Taylor, Toledo, Ohio; John D. Grier, Harlysville, Pa.

[73] Assignee: Owens-Illinois, Inc., Toledo, Ohio

[22] Filed: Feb. 3, 1975

[21] Appl. No.: 546,357

Related U.S. Application Data

[63] Continuation of Ser. No. 316,124, Dec. 18, 1972, Pat. No. 3,877,962.

[52] U.S. Cl. .................. 260/17 R; 260/13; 260/16; 260/30.6 R; 260/37 R; 260/37 M; 260/37 PC; 260/42.54; 260/823; 260/860; 260/873; 260/878 R; 260/901

[51] Int. Cl.² .......................................... C08L 1/28

[58] Field of Search ............... 260/13, 17, 30.6 R, 260/823, 860, 873, 878 R, 901, 16; 427/226

[56] References Cited

UNITED STATES PATENTS

| | | | |
|---|---|---|---|
| 2,515,788 | 7/1950 | Morill | 427/226 |
| 3,625,733 | 12/1971 | Mansur | 427/226 |
| 3,773,554 | 11/1973 | Scrutton et al. | 427/226 |
| 3,784,407 | 1/1974 | Shiio et al. | 427/226 |
| 3,816,162 | 6/1974 | Taylor | 427/386 |
| 3,829,395 | 8/1974 | Goodell | 260/13 |
| 3,877,962 | 4/1975 | Taylor et al. | 427/101 |
| 3,900,682 | 8/1975 | Taylor | 427/386 |
| 3,901,752 | 8/1975 | Taylor | 156/155 |

*Primary Examiner*—Edward M. Woodberry
*Attorney, Agent, or Firm*—Donald Keith Wedding

[57] ABSTRACT

There is disclosed a composition and process for applying an inorganic layer to a substrate which comprises dispersing at least one particulate, solid, inorganic substance in at least one thermally thinnable fugitive vehicle, the vehicle being viscous and non-drying at the temperature of substrate application and convertible to a low viscosity liquid on heating to a higher temperature and thermally removable on heating to a still higher temperature.

5 Claims, No Drawings

SUBSTRATE COATING COMPOSITION

RELATED APPLICATION

This is a continuation of co-pending U.S. patent application Ser. No. 316,124 filed Dec. 18, 1972, now U.S. Pat. No. 3,877,962.

This invention relates to the use of vehicle systems for applying one or more inorganic layers to a substrate.

Fugitive vehicle systems are generally well known in the prior art, as evidenced for example by U.S. Pat. No. 2,312,229 issued to Anderson which discloses a process for coating vitreous surfaces with fluorescent materials by suspending fluoresent powder in a binder comprising a solution of polystyrene in a solvent. Similar systems are disclosed by U.S. Pat. No. 2,328,101 issued to Rosenblatt and U.S. Pat. No. 3,475,161 issued to Ramirez.

Fugitive vehicle systems have been especially useful in the coating art. Thus particulate coating materials are commonly applied to substrates by a wet process, that is, while dispersed in a system consisting of a binder and a solvent. Such a process typically requires mixing of the binder, the solvent, and the inorganic material to form a paste or slurry which is applied to the surface to be coated.

The wet coating technique is commonly used to seal glass or ceramic parts, as in the formation of cathode ray tubes wherein the face plate is attached to the funnel. In such technique, a paste having solder glass distributed throughout a binder-solvent system is applied to the edges of one part in the form of a ribbon. The remaining part is then placed in contact with the paste and the assemblage is heated to evaporate the solvent, burn out the binder, and fuse the solder glass. While this technique is extensively used, quality control is difficult and expensive because of carbonaceous or like residue which may not be removed by evaporation or burning during the heating step. Likewise, during the evaporation of the solvent, there may be changes in the viscosity and/or thixotropic character of the system which may result in such deleterious effects as orange peel formation, fish eye formation, etc., especially on flat surfaces.

In such processes for the application of particulate solid materials to substrates, a commonly encountered difficulty is that the final "fired" layer is relatively porous, of low bulk density, and characterized by high surface roughness and physical heterogeneity. Furthermore, removal of the fugitive vehicle, and particularly of the polymeric binder which is a constituent of the vehicle, is frequently accompanied by partial carbonization.

Such difficulties can be attributed to the physical configuration of the partially processed coating composition: after solvent evaporation, but prior to pyrolytic removal of the polymeric binder, the coating composition consists essentially of a particulate solid substance uniformly dispersed in a matrix of the polymeric binder. In effect, the polymeric matrix necessarily separates solid substance particles from one another: pyrolytic removal of the polymer leaves voids which are not completely removed by settling, sintering, and flow processes which occur after removal of the polymer. Furthermore, the presence of the solid particles interferes with removal of volatile materials produced by thermal decomposition of the polymeric binder; thus removal of the polymer is retarded, the possibility of carbonization is increased, and the formation of bubbled of volatile decomposition products can lead to mechanical disruption of the layer of particles.

The invention at bar is intended to avoid such difficulties by the application of a coating composition consisting of a particulate solid and a fugitive coating vehicle to a substrate, the coated substrate being heated to a temperature sufficient to allow settling of the dispersed solid material(s); this controlled settling provides improved densification of the particulate material prior to removal of the coating vehicle. Subsequently, the coated substrate is heated to a higher temperature, in order to remove the vehicle by thermal decomposition and/or vaporization. Removal of the vehicle is followed by fusion or sintering of the remaining particulate material, with the formation of a continuous, adherent inorganic coating on the substrate.

In accordance with this invention, a coating composition is prepared by dispersing a particulate in organic solid in a selected fugitive organic vehicle. The vehicle is a viscous, non-drying liquid, which can be converted to a low-viscosity liquid by heating a moderate elevated temperature, but which can be completely converted to volatile products by thermal decomposition and/or vaporization at a higher temperature.

This invention also comprises a process for utilizing such coating compositions in order to apply inorganic coatings to substrates. This process comprises the following steps: first, the coating composition is applied to a substrate, uniformly or image-wise, in a conventional coating or printing process (silk screening, letterpress printing, roller coating, brushing, spraying, doctor-blade application, etc.); second, the coating is raised to a moderate elevated temperature for a period sufficient to allow settling of the dispersed solid ingredients; third, the coating is heated to a higher temperature at which the vehicle is removed by thermal decomposition and/or vaporization of the organic component(s); fourth, further heating, optionally at a still higher temperature, leads to the conversion of the particulate solid to a continuous, adherent coating layer as a result of particle sintering, particle fusion, and/or softening of the substrate.

The fugitive organic coating vehicles employed in this invention differ from typical fugitive vehicles described in the prior art. In particular, the fugitive vehicles of this invention are non-drying at ambient temperatures, since they are essentially free of volatile solvents. Their viscosity at ambient temperature is relatively high, since it is intended that settling of the dispersed solids prior to application of coating to substrate be avoided.

In one preferred embodiment of the present invention a liquid polymer is used as the sole constituent of the fugitive organic coating vehicle. This liquid polymer may be described as a resinous or polymeric organic material of relatively low molecular weight, which is stable at temperatures required for settling of dispersed solids (e.g., stable to 100°–150° C.) but which can be converted to volatile products, without the formation of appreciable non-volatile residue, by heating to higher temperatures (e.g., 250°–350° C.). Examples of such liquid polymers would include low-molecular-weight materials selected from the following classes: polyethers including poly(tetrahydrofuran), poly(1,3-dioxolane), and poly(alkylene oxides), especially poly(ethylene oxide) or poly(propylene oxide);

poly(alkyl methacrylates) including those where the alkyl contains one to six carbons, especially poly(methyl methacrylate), poly(ethyl methacrylate), and poly(n-butyl methacrylate); methacrylate copolymers including methyl methacrylate/n-butyl methacrylate copolymers, methyl methacrylate/alpha methyl styrene copolymers, n-butyl methacrylate/alpha methyl styrene copolymers, methyl methacrylate/styrene copolymers, and methyl methacrylate/dimethyl itaconate copolymers; polycarbonates including poly(ethylene carbonate), poly(propylene carbonate), and poly(trimethylene carbonate); polyesters including polycaprolactone, poly(beta-propiolactone), poly(delta-valerolactone), and poly(ethylene oxalate); and other selected polymers and copolymers including polyisobutylene, polystyrene, poly(alkyl vinyl ethers), styrene/alpha-methylstyrene copolymers, vinyl toluene/alpha-methylstyrene copolymers, and olefin-sulfur dioxide copolymers. Blends of two or more liquid polymers of these types may also be used as fugitive organic coating vehicles.

In a second specific embodiment of the present invention the fugitive organic coating vehicle consists essentially of a solution of a pyrolytically removable solid polymer in s liquid polymer. Typically, the solid polymer will be a high-molecular-weight material selected from the classes of polymers listed above, while the liquid polymer is a low-molecular-weight material selected from the same classes of polymers. The solid polymer may also be selected from other polymeric materials which can be converted, via thermal decomposition, to volatile products; examples of such materials include such cellulose derivatives as ethyl cellulose, methyl cellulose, hydroxyethyl cellulose, hydroxypropyl cellulose, etc. The solid polymer and the liquid polymer may be of the same or different chemical types.

Polymeric materials having oxygen atoms selectively incorporated in the molecular chain, as for example, peroxy linkages in the chain, may be used as the coating vehicle or as components thereof. Such polymers are disclosed in U.S. Pat. No. 3,639,365 issued to Dr. Don N. Gray. Typically there is used a copolymer, terpolymer, or quadpolymer of oxygen and at least one monomer of alkyl methacrylate with the alkyl containing one to six carbon atoms, e.g., methyl to hexyl, preferably butyl. Copolymers of oxygen with other vinyl monomers may also be used.

In a third specific embodiment of the present invention, the fugitive organic coating vehicle consists essentially of a solution of a thermally removable solid polymer in an organic liquid of low volatility. A high-molecular weight solid polymer selected from the classes listed above may be used as the polymeric constituent. The low-volatility solvent will be an organic liquid having a boiling point above 200° C., and preferably in the range of 300° to 450° C.

Examples of suitable low-volatility solvents include the following:

ESTERS

Benzyl benzoate; benzyl salicylate; bis(2-butoxyethyl) phthalate; bis(2-ethoxyethyl) adipate; bis (2-ethoxyethyl) sebacate; bis(2-ethylhexyl) adipate; bis (2-ethylhexyl)phthalate; bis(2-ethylhexyl)sebacate; bis(2-methoxyethyl) adipate; bis (2-methoxyethyl) phthalate; butyl benzoate; isobutyl benzoate; isobutyl decanoate; butyl stearate; didodecyl phthalate; ethyl benzoylacetate; ethyl cinnamate; ethyl myristate; ethyl 2-naphthoate; ethyl oleate; pentyl laurate; sucrose acetate isobutyrate; sucrose octaacetate; triacetin; tributyl citrate; tributyrin; triethylene glycol diacetate; isoamyl salicylate; dibutyl tartrate; butyl laurate; trioctyl trimellitate; tetrahydrofurfuryl oleate; butyl oleate; isooctyl palmitate; glycerol diacetate; ethyl phthalyl ethyl glycolate; bis(2-ethylhexyl) isophthalate; diethyl phthalate; di-n-butyl phthalate; butyl benzyl phthalate; butyl ricinoleate; diethyl sebacate; dibutyl sebacate; dibutyl succinate; di-n-butyl adipate; diisobutyl adipate; di-n-hexyl azelate; diethylene glycol dibenzoate; acetyl triethyl citrate; acetyl tributyl citrate.

KETONES

1'-Acetonaphthone; acetophenone; butyrophenone; isobutyrophenone; 1-tetralone; 2-cyclohexyl cyclohexanone.

ETHERS

Benzyl butyl ether; dibenzyl ether; bis[2-(2-methoxyethoxy) ethyl] ether; benzyl isopentyl ether.

HYDROXY COMPOUNDS

Anisyl alcohol; 2-benzyloxyethanol; n-decyl alcohol; guaiacol; isoeugenol; 2-phenoxyethanol; 1-phenoxy-2-propanol; alpha-terpineol; triethylene glycol; tetraethylene glycol; tetraethylene glycol monomethyl ether; nonyl phenol; propylene glycol; phenyl n-hexyl carbinol.

HYDROCARBONS

Bicyclohexyl; diphenylmethane; squalane; tetrahydronaphthalene; dodecylbenzene; dimethyl naphthalene (various isomers and mixtures, thereof); 1,1-diphenylethane.

ORGANIC PHOSPHATES

Tritolyl phosphate; cresyl diphenyl phosphate; tributyl phosphate; tri(2-ethylhexyl) phosphate.

CHLORINATED HYDROCARBONS

Chlorinated paraffins; chlorinated biphenyls and terphenyls; 1-chloronaphthalene.

MISCELLANEOUS

N-Cyclohexyl pyrrolidone; butyl carbitol formal.

The heat required in order to raise the temperature of the coating composition to the range required for settling of dispersed solids, and to the range required for removal of the polymeric binder, can be supplied by any convenient means, such as oven heating, infrared heating, exposure to flames, exposure to visible, ultraviolet, or microwave radiation, etc. Removal of the organic vehicle may involve thermal decomposition, oxidative decomposition, evaporation, or a combination thereof; such removal may be conducted in any convenient atmosphere, including air, partial vacuum, high vacuum, oxygen, nitrogen, argon, or other gases.

Particulate solids which may be applied to surfaces in accordance with this invention include glasses, ceramic materials, inorganic oxides, metals, colorants, and phosphors, as well as combinations of such materials. The resulting coatings may serve a variety of functions, such as substrate protection, decoration, information display, etc. They may also serve as components of microelectronic circuits, such as conductors, resistors, and insulating glazes.

We claim:

1. As a composition of matter, a coating system to be applied to a substrate, the system consisting of at least one particulate, solid, inorgainc substance dispersed in at least one thermally thinnable fugitive vehicle, said fugitive vehicle being a low-molecular-weight liquid polymer selected from the group consisting of polyethers, poly(alkyl methacrylates), methacrylate copolymers, polycarbonates, polyesters, polyisobutylene, polystyrene, poly(alkyl vinyl ethers), styrene/alpha-methylstyrene copolymers, vinyl toluene/alphamethylstyrene copolymers, and olefin-sulfur dioxide copolymers, the vehicle being non-drying and sufficiently viscous at the temperature of the substrate application to prevent settling of said dispersed particulate solid substance and convertible to a sufficiently low viscosity liquid on heating to a higher temperature to permit controlled settling of and improved densification of said particulate solid substance and thermally removable on heating to a still higher temperature leaving said particulate solid substance.

2. As a composition of matter, a coating system to be applied to a substrate, the system consisting of at least one particulate, solid, inorganic substance dispersed in at least one thermally thinnable fugitive vehicle, said fugitive vehicle being a solution of at least one high-molecular-weight solid polymer in at least one low-molecular-weight liquid polymer, said polymers being selected from the same or different members of the following classes: polyethers, poly(alkyl methacrylates), methacrylate copolymers, polycarbonates, polyesters, polyisobutylene, polystyrene, poly(alkyl vinyl ethers), styrene/alpha-methylstyrene copolymers, vinyl toluene/alpha-methylstyrene copolymers, olefin/sulfur dioxide copolymers, and cellulose ethers, the vehicle being non-drying and sufficiently viscous at the temperature of the substrate application to prevent settling of said dispersed particulate solid substance and convertible to a sufficiently low viscosity liquid on heating to a higher temperature to permit controlled settling of and improved densification of said particulate solid substance and thermally removable on heating to a still higher temperature leaving said particulate solid substance.

3. As a composition of matter, a coating system to be applied to a substrate, the system consisting of at least one particulate, solid, inorganic substance dispersed in at least one thermally thinnable fugitive vehicle, said fugitive vehicle being a solution of at least one high-molecular-weight polymer in at least one organic compound boiling above 200° C; said polymer being selected from polyethers, poly(alkyl methacrylates), methacrylate copolymers, polycarbonates, polyesters, polyisobutylene, polystyrene, poly(alkyl vinyl ethers), styrene/alpha-methylstyrene copolymers, vinyl toluene/alpha-methylstyrene copolymers, olefin-sulfur oxide dioxide copolymers, and cellulose ethers; and the organic compound being selected from esters, ketones, ethers, hydroxy compounds, hydrocarbons, organic phosphates, and chlorinated hydrocarbons, the vehicle being non-drying and sufficiently viscous at the temperature of the substrate application to prevent settling of said dispersed particulate solid substance and convertible to a sufficiently low viscosity liquid on heating to a higher temperature to permit controlled settling of and improved densification of said particulate solid substance and thermally removable on heating to a still higher temperature leaving said particulate solid substance.

4. The invention of claim 1 wherein the particulate solid inorgianic substance is selected from glasses, ceramic materials, inorganic oxides, metals, colorants, and phosphors.

5. The invention of claim 3 wherein said organic compound has a boiling range between 300° and 450° C.

* * * * *